United States Patent Office 3,425,250
Patented Feb. 4, 1969

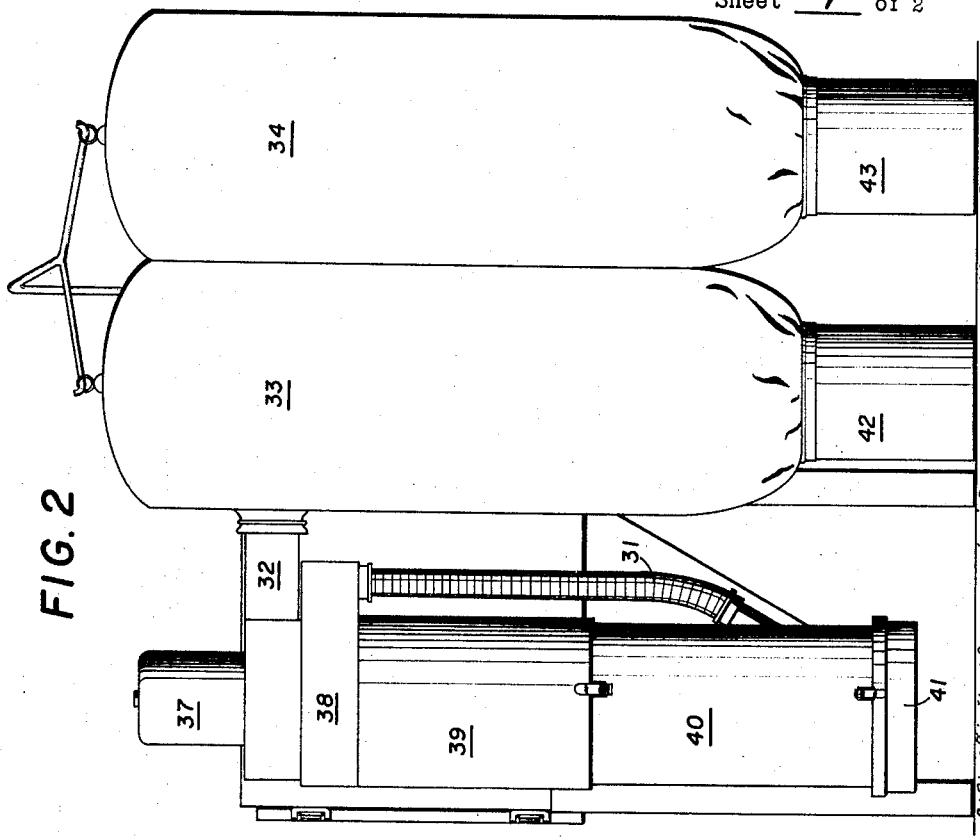
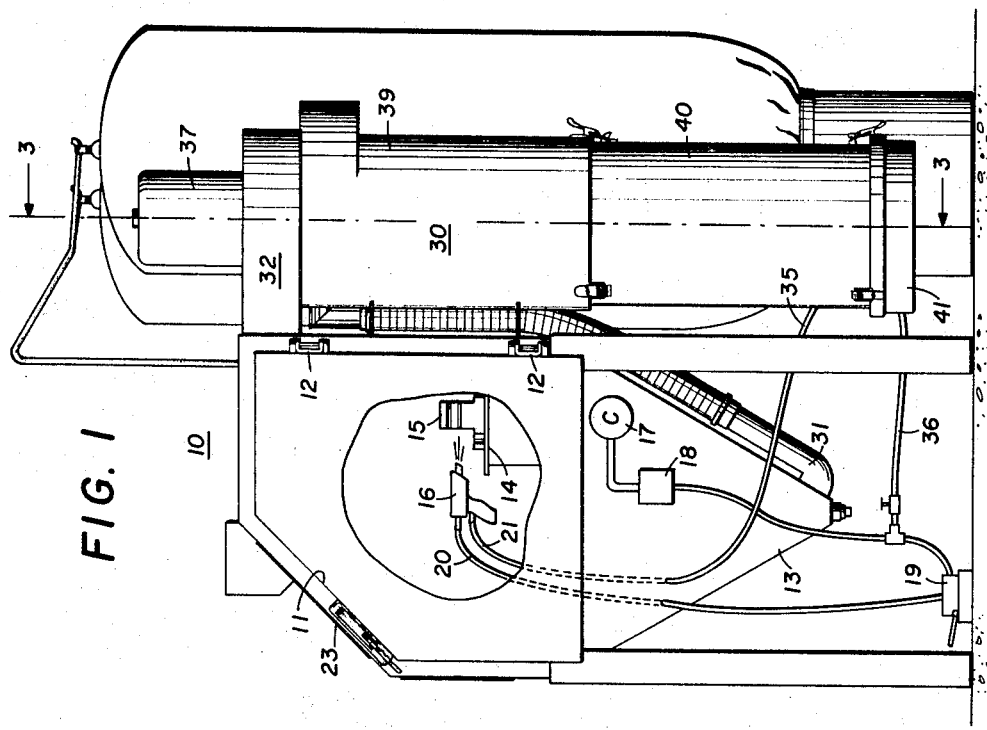

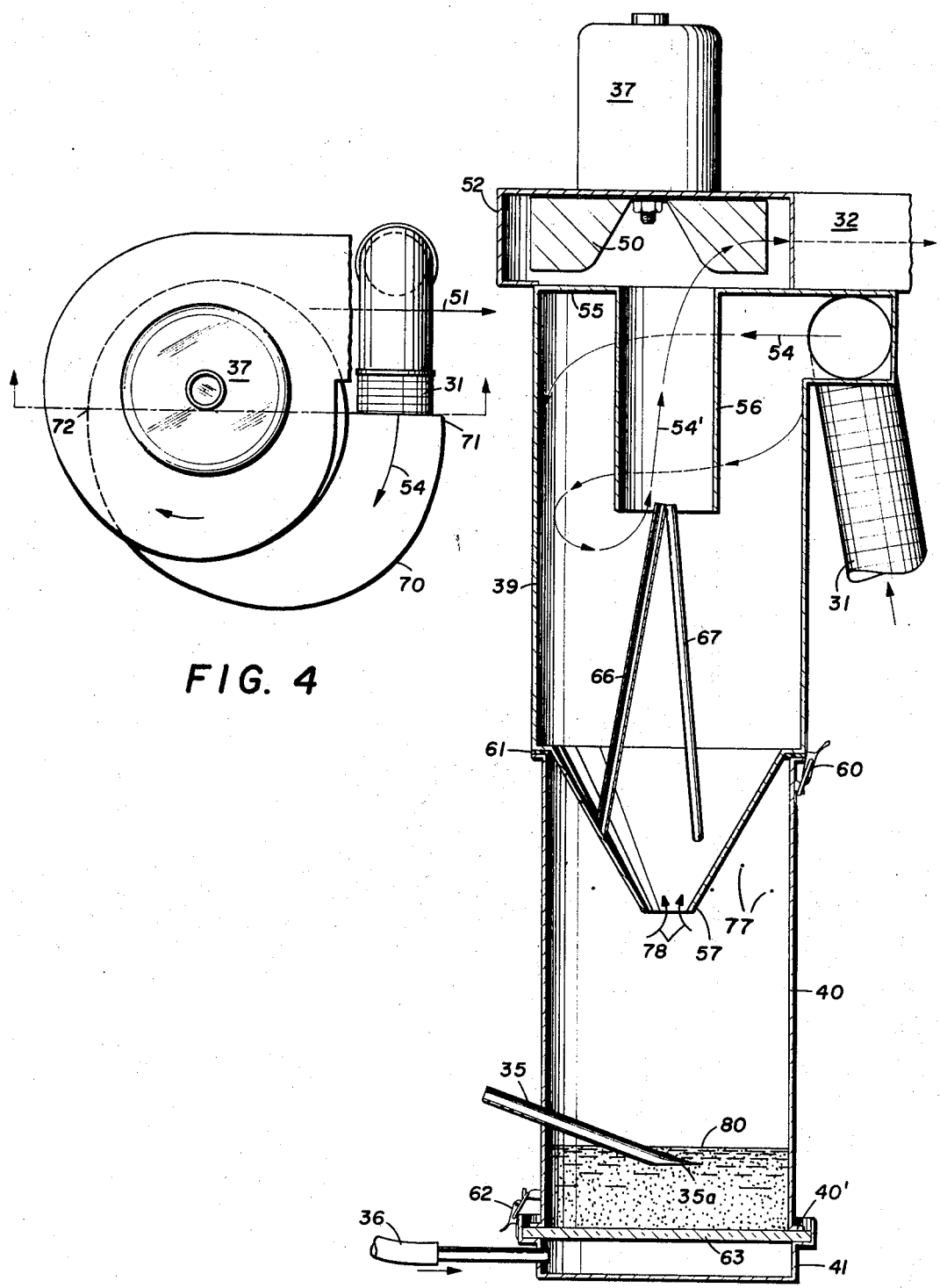

3,425,250
PEENING BEAD CLEANER
Louis A. Farris, Jr., Dallas, and Luther W. Young, Arlington, Tex., assignors to Surcon Surface Conditioning Products, Dallas, Tex., a corporation of Texas
Filed Oct. 22, 1965, Ser. No. 502,185
U.S. Cl. 72—53
Int. Cl. B21d *31/06;* B01d *29/10;* B04c *5/04*
6 Claims

ABSTRACT OF THE DISCLOSURE

A peening material separator includes an elongated separator enclosure through which a truncated bottom cone provides a channel. A duct structure passes through an air-tight upper closure member on the separator enclosure and extends centrally downward to an intermediate point along the length of the separator enclosure. A motor driven impeller creates a low pressure at the upper end of the duct structure and withdraws air from the enclosure. Peening material is tangentially delivered into the separator enclosure at the upper end thereof, whereby enlarged particles of the peening material fall through the truncated bottom cone to a collecting chamber and small particles of the peening material are carried from the separator enclosure through the duct structure. The large particles which fall into the collecting chamber are supported upon a porous baffle through which pressurized air is passed to fluidize the large particles. A suction tube extends through the wall of the separator enclosure to selectively withdraw the large particles.

---

This invention relates to peening with jet driven abrasive particles and more particularly, to a system for cleaning dust and broken particles from a circulating supply of peening particles.

Fine particle blasting for cleaning purposes and the like has long been known. The peening process involves cold hammering which has been found to improve metal quality. Over a period of several decades, peening methods have been greatly improved. It has been found to be highly desirable to project small spherical glass beads onto a metallic surface at relatively high velocity for peening purposes. The effect is that a microscopic hammer thus impinging a body creates a dent in the metal stretching the area radially and causes plastic flow of the surfaces. The effective depth of the cold working action varies with the impact of the spheres and the condition of the work. There are many advantages that result from such operations. However, it has been found that impact of glass beads on metal particles causes a deterioration of the supply of glass beads so that if the supply is merely recirculated through an air gun, the quality of the peening operation is reduced substantially. It has therefore been found desirable to maintain the supply of peening materials free from dust and broken glass beads. The present invention is directed to a system which maintains a recirculating supply of glass beads for peening purposes substantially free from broken beads and dust.

In accordance with the invention, the separator includes an elongated vertically oriented separator enclosure having a bottom cone which is truncated to provide a channel therethrough and a top which has an air-tight closure member except for a duct centrally extending through the closure member and downward to an intermediate point along the length of the separator enclosure. A motor-driven impeller for creating a low pressure is mounted at the upper end of the duct for withdrawing air from the enclosure. An input duct enters the enclosure tangentially near the upper end and adjacent to the closure member for delivery of material to the enclosure wherein large particles fall through the cone and small particles are carried through the duct. A storage chamber is secured in an air-tight manner to the lower end of the enclosure as to encompass the cone. Preferably a porous baffle forms a closure for the bottom of the storage means and supports the material thereon, and means are provided for flowing pressurized air into the storage chamber through the baffle to fluidize the material. A suction tube extends through the wall of the storage chamber and has a downwardly facing opening spaced a predetermined distance above the baffle for withdrawal of material.

For a more complete understanding of the present invention and for further objects and advantages thereof, reference may now be had to the following description taken in conjunction with the accompanying drawings in which:

FIGURE 1 is a side view partially broken away showing a peening system embodying the present invention;

FIGURE 2 is a rear view of the system of FIGURE 1;

FIGURE 3 is a sectional view of the power pack unit of FIGURE 1 taken along lines 3—3; and FIGURE 4 is a top view of the power pack unit of FIGURE 3.

In FIGURE 1, a peening chamber 10 is provided with a side door 11 mounted on hinges 12. The bottom 13 of the chamber is funnel or cone shaped. A suitable work-supporting surface 14 is provided inside the chamber 10 to support a work piece, such as the work piece 15. An air gun 16 is hand operable with access being had through sleeves in the front wall of the chamber 10. A jet of compressed air is employed, being supplied from a compressor represented by unit 17 by way of a pressure regulator 18 and a foot actuated valve 19. Air from valve 19 passes by way of an air line 20 to the gun 16.

The gun 16 operating on the venturi principle serves to draw a stream of glass beads by way of the second line 21 from a suitable bead supply chamber. As a result, a high velocity of glass beads is directed onto the work piece 15 to remove corrosion, increase fatigue strength, relieve stresses, seal pores, and improve wear and lubricating qualities, de-burr, level and smooth the surface and provide a micro-edge surface. Many are the reasons for carrying out such an operation. The chamber 10 is provided with a viewing glass panel (not shown) in the front sloping surface 23. The beads propelled at high velocity will be contained within the chamber 10. As the beads lose velocity, they fall to the bottom of the cone-shaped portion of the chamber 10.

The present invention is particularly directed to the cleaning and handling of the supply of peening beads so that they can be continuously recirculated through the system and will be maintained free of dust and of broken bead particles. In accordance with the present invention, a power pack unit 30 is mounted on the back of the chamber 10. It has an intake duct 31 which leads from the bottom of the cone-shaped section 13 of the chamber 10. It has an output duct 32, FIGURE 2, which leads to a pair of dust bags 33 and 34. Unit 30 is provided with a bead suction line 35 which is connected to the line 21 leading to gun 16. A fluidizing air line 36 leads to the bottom of the unit 30. A motor 37 is mounted on the top of the unit 30 and serves to drive an impeller mounted in the output duct 32. Such an impeller, driven by the motor 37, creates a pressure in the dust bags 33 and 34 and in so doing withdraws the glass beads from the bottom of the section 13. The beads are drawn upward through the duct 31 into the deflector zone 38 of the power pack unit. The power pack unit includes an upper separator section 39, a lower collector section 40 and a fluidizing section 41.

In operation, the beads drawn into the deflector section 38 are separated by gravity in the section 39. The whole beads fall down into unit 40. Broken beads and dust particles are drawn upward into the exhaust duct 32 and are deposited in bags 33 and 34. The dust and broken beads thus are collected in the buckets 41 and 42, whereas the whole beads collect in the bottom of the unit 40.

The operation of the device may be better understood by referring to FIGURE 3. It will be seen that the motor 37 drives an impeller 50 in the upper or output duct 32. As best seen in FIGURE 4, the impeller rotates clockwise so that air is exhausted from the unit 30 along the direction of the arrow 51 and leaves the unit tangentially of the housing 52. The beads, dust and broken particles enter the unit 30 tangentially from the duct 31 as seen in FIGURE 4. The input supply follows the path represented by the arrow 54. The top of the power pack unit has a closure plate 55 in which a downwardly depending open-ended duct 56 is secured. The upper end of the duct 56 opens into the chamber for impeller 50. The lower end of the duct 56 terminates about midway of the separating section 39. The lower end of the separating section 39 is in the form of a cone 57 having the upper end substantially the same diameter as the diameter of the section 39 and the lower end of substantially reduced diameter.

The collector section 40 is secured, as by clamps 60, to the base of the conical section 57 in an air-tight manner with gaskets such as the gasket 61 being provided for this purpose. The collector section 41 has an open flanged bottom with a flange 40' extending therearound.

The fluidizer section 41 is clamped to the flanged end of collector 40 by means of a plurality of clamps 62 (only one being shown). A porous baffle 63 is mounted in the top of the fluidizing section 41 and is forced into abutting relation with the flange 40'. Suction tube 35 extends through the wall of the collector section 40 near the lower end thereof and has a downwardly facing open flared end 35a.

Three tubes, two of which, the tubes 66 and 67, are shown in FIGURE 3, extend from about midway along the height of the cone 57 to a point just above and inside the lower end of the duct 56. Air flows through the channels formed by tubes 66 and 67 to increase air agitation in the bottom of the collector section 40 and to assist in propelling the light dust particles and broken beads through the duct 32.

From FIGURE 4, it will be noted that the input duct 38 has a spiral configuration with the outer wall 70 changing from point 71 where the radius is approximately equal to the radius of the separating section 39 plus the diameter of the duct 31 to point 72 where the radius is equal to the radius of the separating section 39. Thus, as dust particles, beads, and broken beads enter the separating section 39 as along path 54, they follow a spiral path. The dust and broken beads generally will follow the path 54'. Thus, they are drawn upwards by the suction created by the impeller 50 and are propelled through the duct 32 into the dust bags 33 and 34. However, the heavier full size beads, which offer more resistance and are of greater mass than the broken beads and dust, will fall downwardly through the cone 57 to the bottom of collector unit 40.

At a point immediately above the bottom of the cone 57, a plurality of holes 77 are formed in the outer wall of the storage unit 40. The holes permit some ingress of air so that an airflow, as represented by arrows 78, will be established upward through the truncated apex of the cone 57. This serves to assist in removing the broken beads and the dust particles while permitting full glass beads to fall on through. It has been found that the placement, size and the number of holes 77 can be selected as to control substantially the separation between full beads and the broken beads.

As the beads collect in the bottom of the storage unit 40, the low pressure produced at the mouth 35a of the suction tube 35 by venturi action in the gun 16 draws the beads upward into the suction tube and thence to the gun. To aid in maintaining a fluidized glass bead bed, air is forced in through the pressure tube 36 to the fluidizing section 41. The high pressure air thus introduced flows upwardly through the porous baffle 63 and thence upward through the bed 80 of glass beads to maintain the bed in a fluid state thereby assuring a constant supply of glass beads for the gun 16.

In one embodiment of the invention, the separator enclosure 39 was twelve inches in diameter and sixteen inches in length. The collector chamber 40 was ten and one-half inches in diameter and twenty inches in length. The cone 57 was seven inches high and had a bottom opening two inches in diameter. The baffle plate 63 was a one-half inch disk of porous pressed fiberboard. Holes 77 were about one-sixteenth inch in diameter and were fourteen in number. The tubes 66 and 67 were one-half inch in diameter. The motor 37 was one-third horsepower. In this system, air was supplied to the gun 16 by way of line 20 at 80 pounds per square inch and air flow was at the rate of about 25 cubic feet per minute. Air was supplied by way of line 36 to the fluidizing section 41 at the same pressure as supplied to the gun 16. Glass beads having diameters of the order of several hundred microns were thus employed for peening purposes, with substantially all broken beads and all dust being removed, thus maintaining a supply of unbroken beads in the collector unit 40 available for use in the gun 16.

The gun may be of the type manufactured and sold by Surcon, 8401 Chancellor Row, Dallas, Tex., and included in a unit identified as Model DV-100B. High grade optical crown glass lead-free beads of the soda lime type, having a minimum of silica of 68% and specific gravity of about 2.5, have been used. Beads of diameter in the range of from 840 to 53 microns have been employed.

Having described the invention in connection with certain specific embodiments thereof, it is to be understood that further modifications may now suggest themselves to those skilled in the art and it is intended to cover such modifications as fall within the scope of the appended claims.

What is claimed is:
1. A peening material separator which comprises:
 (a) an elongated vertically oriented separator enclosure having a bottom cone which is truncated to provide a channel therethrough and a top which has an airtight closure member except for a duct structure through said closure member and extending centrally downward to an intermediate point along the length of said separator enclosure,
 (b) a motor-driven impeller for creating a low pressure at the upper end of said duct structure for withdrawing air from said enclosure,
 (c) an input duct entering said enclosure tangentially near the upper end and adjacent to said closure member for delivery of peening material into said separator enclosure, whereupon large particles fall through said cone and small particles are carried through said duct structure,
 (d) a storage chamber secured air-tight to the lower end of said enclosure and encompassing said cone,
 (e) a porous baffle forming a closure for the bottom of said storage chamber to support said large particles,
 (f) means for producing flow of pressurized air into said storage chamber through said porous baffle to fluidize said large particles, and
 (g) a suction tube extending through the wall of said storage chamber having a downwardly facing opening spaced above said porous baffle for withdrawal of said large particles.

2. The combination set forth in claim 1 in which a plurality of channels extend from mid-height points on said cone into the lower end of said duct structure.

3. The combination set forth in claim 1 in which a plurality of small orifices are formed in the wall of said storage chamber at a height corresponding about to the bottom of said cone.

4. The combination set forth in claim 1 in which dust bags are connected to receive air flow from said impeller.

5. A peening system which comprises:
   (a) a closed peening chamber having a venturi air gun therein and a bottom reservoir,
   (b) an elongated vertically oriented separator enclosure having a bottom cone which is truncated to provide a channel therethrough and a top which has an air-tight closure member except for a duct structure through said closure and extending centrally downward to an intermediate point along the length of said separator enclosure,
   (c) a dust collector,
   (d) a motor-driven impeller for creating a low pressure at the upper end of said duct structure for delivering air from said enclosure to said collector,
   (e) an input duct leading from said reservoir tangentially to said enclosure near the upper end and adjacent to said closure member for delivery of peening material from said reservoir to said enclosure where large particles fall through said cone and small particles travel through said duct structure to said collector,
   (f) a storage chamber secured air-tight to the lower end of said enclosure and encompassing said cone,
   (g) a porous baffle forming a closure for the bottom of said storage chamber to support said large particles,
   (h) means producing flow of pressurized air into said storage chamber through said porous baffle to fluidize said large particles, and
   (i) a suction tube leading from said gun through the wall of said storage chamber and having a downwardly facing opening spaced above said porous baffle for delivery of said large particles to said gun.

6. In a peening material separator, the combination which comprises:
   (a) an elongated vertically oriented separator enclosure having a bottom cone which is truncated to provide a channel therethrough and a top which has a closure member which is air-tight except for a duct structure through said closure member extending centrally downward to an intermediate point along the length of said separator enclosure,
   (b) a motor-driven impeller for creating a low pressure at the upper end of said duct structure for withdrawing air from said enclosure,
   (c) an input duct entering said enclosure tangentially near the upper end and adjacent to said closure member for delivery of peening material to said enclosure, whereupon large particles fall through said cone and small particles are carried through said duct structure,
   (d) a storage chamber secured air-tight to the lower end of said enclosure and encompassing said cone,
   (e) means for maintaining agitation of said large particles in the bottom of said storage chamber, and
   (f) a suction tube extending through the wall of said storage chamber having a downwardly facing opening for withdrawal of said large particles.

References Cited
UNITED STATES PATENTS

| | | | |
|---|---|---|---|
| 2,418,061 | 3/1947 | Weinberger | 209—144 |
| 2,982,007 | 5/1961 | Fuchs et al. | 29—90 |
| 3,031,080 | 4/1962 | Lapple | 209—144 |
| 3,064,811 | 11/1962 | Mumper | 209—144 |
| 3,084,798 | 4/1963 | Lau | 209—144 |
| 3,199,171 | 8/1965 | Hellmann et al. | 29—90 |
| 3,235,090 | 2/1966 | Bose et al. | 209—144 |
| 3,333,402 | 8/1967 | Kalen | 55—459 |

CHARLES W. LANHAM, *Primary Examiner.*

A. RUDERMAN, *Assistant Examiner.*

U.S. Cl. X.R.

209—144, 3; 55—372, 431, 439, 460; 29—90